United States Patent [19]

Barrall et al.

[11] Patent Number: 4,872,912
[45] Date of Patent: * Oct. 10, 1989

[54] WET AND DRY LAID PHOSPHATE REACTIVE SHEETS AND PHOSPHATE CERAMIC STRUCTURES MADE THEREFROM

[75] Inventors: Jeffery L. Barrall; Robert C. Garman, both of Lancaster, Pa.

[73] Assignee: Armstrong World Industries, Inc., Lancaster, Pa.

[*] Notice: The portion of the term of this patent subsequent to Dec. 20, 2005 has been disclaimed.

[21] Appl. No.: 119,863

[22] Filed: Nov. 13, 1987

[51] Int. Cl.[4] .................... C04B 9/06; C04B 28/34
[52] U.S. Cl. .................... 106/85; 106/121; 264/333; 428/182; 501/95; 501/111
[58] Field of Search .................. 106/85, 121; 428/182; 501/95, 111; 264/333

[56] References Cited

U.S. PATENT DOCUMENTS

| | | | |
|---|---|---|---|
| 4,072,533 | 2/1978 | Barrall et al. | 106/84 |
| 4,109,032 | 8/1978 | Barrall | 106/DIG. 2 |
| 4,351,641 | 9/1982 | Tymon | 8/638 |
| 4,569,878 | 2/1986 | Barrall et al. | 428/182 |
| 4,592,966 | 6/1986 | Prior et al. | 428/689 |
| 4,603,085 | 7/1986 | Fidler et al. | 428/409 |
| 4,604,318 | 8/1986 | Prior et al. | 428/689 |
| 4,707,298 | 11/1987 | Tymon | 252/378 R |
| 4,746,403 | 5/1988 | Ko et al. | 162/108 |
| 4,762,643 | 8/1988 | Bohrn et al. | 501/95 |
| 4,775,586 | 10/1988 | Bohrn et al. | 252/378 R |
| 4,792,359 | 12/1988 | Barrall et al. | 106/85 |
| 4,800,041 | 1/1989 | Tymon et al. | 106/121 |

OTHER PUBLICATIONS

Shreve, "Pulp and Paper Industries", Chemical Process Industries, 3rd Edition, 1967, pp. 631–648.

*Primary Examiner*—Jacqueline V. Howard
*Assistant Examiner*—Anthony J. Green

[57] ABSTRACT

Phosphate reactive sheets and substrates can be prepared using wet-laying and dry-laying techniques. The wet or dry-laid composition contains calcium silicate and a non-reactive matrix of either fiber or a mixture of fiber and a binder. The matrix is used in an amount effective to hold the wet or dry-laid material together. At a desired time such phosphate reactive substrate compositions can be contacted with aqueous solutions of phosphoric acid. A metal oxide selected from aluminum oxide, magnesium oxide, zinc oxide, and calcium oxide must be present in either the substrate, the solution, or both. After the solution contacts the substrate, a reaction takes place within the matrix to form a rigid article.

42 Claims, No Drawings

WET AND DRY LAID PHOSPHATE REACTIVE SHEETS AND PHOSPHATE CERAMIC STRUCTURES MADE THEREFROM

BACKGROUND OF THE INVENTION

1. Field of the Invention

The present invention relates to phosphate reactive dry or wet-laid sheets and phosphate structures made therefore. Such structures are useful as packaging materials, packing structures, partitions, wall decorations sheets for the interior surface of buildings, aircraft, automobiles, and the like.

These compositions can also be bonded to other substrates such as paper, ceramic, metallic surfaces or the like for a particular use.

2. The Prior Art

A number of references can be found in the prior art which describe phosphate ceramic materials, laminated composites and processes for their preparation.

U.S. Pat. No. 4,569,878, for example, describes laminated composites prepared from the reaction of a metal oxide, calcium silicate and phosphoric acid. These composites are characterized in that they have superior fire resistant properties. The laminated structures described in this reference comprise contiguous layers of a selected structural layer material with intervening layers of the bonding composition used which comprised a metal oxide calcium silicate and the phosphoric acid.

The same reactants are also disclosed and applied in U.S. Pat. No. 4,375,516. This reference relates to the preparation of rigid, water resistant phosphate ceramic materials and processes for either foamed or non-foamed materials. Advantages are provided with the instant invention by using paper and board making technology to form phosphate reactive sheets.

The instant phosphate reactive paper-like materials are light and flexible and, if desired, can be torn or cut into a particular size. The light, flexible nature of these substrates allows the sheet to be bent, folded, or molded around particular objects or in a desired configuration. The application of phosphoric acid will then cause the reactive sheet to cure into a solid, rigid form.

Advantageously, by using either wet laying or dry laying techniques a reactive sheet product is prepared which contains an unusually large amount of dry material that can be wetted with a modest portion of reactant solution. Furthermore, the use of these techniques allows the preparation of a useful, reactive sheet composition which, moreover, is unusually compact and easily moved or stored until it is wetted with a reactive solution and allowed to react to give the solid product.

SUMMARY OF THE INVENTION

It has been discovered that by using wet laying or dry laying procedures, a phosphate reacting substrate composition can be prepared. Further, because of its form, it can be completely wetted by only a modest amount of phosphate solution at any desired time. This composition comprises a wet or dry laid mixture of calcium silicate (wollastonite) and a matrix of fiber or binder and fiber. The matrix must be present in an amount to hold the material together in the form of the substrate. In preferred embodiments, a metal oxide selected from the group consisting of: aluminum oxide, zinc oxide, magnesium oxide, and calcium oxide is included as a phosphate reactant along with the calcium silicate.

A phosphoric acid solution can be applied to such reactive substrates to obtain a rigid phosphate ceramic article. Since the phosphate reaction system requires a metal oxide, either the substrate used or the solution or both will have combined therein a metal oxide selected from the group previously specified.

The substrate material can be bent, molded, or otherwise shaped into a suitable configuration either before the application of the phosphoric aicd, during the application of the phosphoric acid, or after the application of the phosphoric acid but before curing makes the material rigid. It is preferred, however, to place the phosphate reactive material into the configuration after the application of the solution, but before setting, permitting an easier and more thorough wetting.

If no metal oxide is included in the wet-laid or dry-laid substrate, then in order to obtain the phosphate ceramic, the required, effective amount of metal oxide is used with an aqueous solution of phosphoric acid. In other preferred embodiments, the metal oxide is used in both the substrate and the solution.

The term "wet laying" is used herein to refer to the procedure which involves forming a slurry of the materials desired for the reactive substrate (wollastonite, fiber, metal oxide, filler, binder, pigment, etc.); flocculating the solids out of the slurry using the addition of a flocculant; and forming the substrate material using dewatering with an appropriate apparatus such as a Fourdrinier paper-making machine. This procedure is especially useful when a low fiber phosphate reactive substrate is desired. If wet laying is used, the phosphate reactive substrates can be prepared having only an effective amount of the matrix. Acceptably, a mininum of 10% by weight of fiber can be included, or a minimum of about 5% by weight fiber with an effective amount of a binder, (at least .5% by weight). With no binder, a minimum of 14% by weight fiber is preferred.

The term "dry laying" refers to the air-laying procedures typically used for ceiling and wallboards, cardboards, and other paper products. In such procedures, the ingredients typically are placed in the sheet from (laid) using rapidly flowing air. No slurry, flocculation, or dewatering is needed. The dry laid substrates, however, tend to be thicker than the wet laid substrates.

When dry laying is used to prepare the instant phosphate-reactive compositions, an effective amount of matrix must also be used to give the reactive substrate enough continuity and body for it to be moved and wetted without falling apart. It is recommended that dry laid phosphate reactive sheets have a minimum of about 50% by weight of fiber with an effective amount of binder. Without binder a minimum of about 65% by weight fiber will be used.

When the term "matrix" is used herein, it refers to the non-reactive portion of the phosphate reactive substrate materials that is made of the fiber with or without a binder. The matrix provides the body, bulk, and structure needed for the sheet; and as the reaction takes place, it combines with the reaction product to give the finished article. The matrix material can also be used to provide characteristics desired for the end use. Such characteristics can include decorative properties, electrical properties, acoustical properties, or physical properties, such as shock resistance, flexural strength, thermal conductivity, and the like.

A variety of phosphate ceramic structures can be made using the instant phosphate reactive substrate materials and the phosphoric acid solution. One particularly useful application, however, is in the packing industry. Conveniently, the instant phosphate reactive sheet materials are flexible and pliable until after the phosphoric acid solution has been applied and the reaction has caused the sheet to "set" (become rigid). Fragile, rare, and expensive items can be protected by using the instant invention. In such cases, for example, a fragile piece of glass or antique could be surrounded with the phosphate reactive sheet material while the sheet is pliable. If desired, the exterior of the object can be protected from the phosphate solution by using a water tight wrapping such as a plastic bag, film, or other suitable material. Further, if desired, other soft packing materials can also be placed around the object. The object of the metal oxide, phosphoric acid, and calcium silicate will form a phosphate ceramic and cause the sheet material to become rigid. Thus, the sheet material becomes a protective shell around the center object. This shell will absorb shock, protect against concussions to the object frequently caused by motion, protect against scratching, and will help protect from pressure encountered during or because of storage or load shifts. Later, at the desired time, the object can be extracted from its protective shell by breaking or cutting the shell with a selected instrument.

To obtain the instant reaction substrates, it is important to have both the non-reactive matrix ingredients and the phosphate-ceramic reactants, and it is important to use either wet laying or dry laying to prepare the substrate. In producing the instant compositions using either the wet or dry laying method, the matrix could account for as much as 85% by dry weight of the total weight of the phosphate reactive material.

DETAILED DESCRIPTION

The embodiments of the instant invention includes both the wet laid and the dry laid phosphate reactive sheets. The embodiments of the instant invention also includes the combination of separate compositions which can be used together to produce particular phosphate ceramic products. Thus, the combination of the reactive phosphoric acid solution and the wet or dry laid phosphate reactive sheet is a specific embodiment. It should, therefore, be appreciated that the instant phosphate reactive wet or dry laid sheets can be prepared for specific use with phosphoric acid solutions. Alternatively, solutions can be prepared depending upon the reactant concentrations already in the sheet. In such a case, the concentration of the solution ingredients will, to an extent, depend on the intended use.

Each substrate must contain an amount of calcium silicate which will be effective to produce the amount of ceramic material needed in a useful article. While the amount required in any case will largely depend on the intended use, the application of pressure and use of the fiberous matrix (with or without binder and other desired materials) can permit useful ceramicmatrix materials to be produced using smaller amounts of calcium silicate. Useful materials can also be obtained which could not be obtained without the presence of the matrix.

The amount of calcium silicate can, therefore, vary widely depending upon the intended application and weight or density of other ingredients. Calcium silicate could be as low as about 15% by weight of the substrate material. An acceptable range for the amount of calcium silicate in the substrate can be from about 15% to about 95% by weight of the dry substrate; and a preferred amount ranges from about 20 to about 86% by total dry substrate weight. The amount of the metal oxide required for the reaction can also be incorporated either in the solution, in the substrate, or both. When it is present in the substrate, it should be homogeneously mixed with the wollastonite.

In a reactive sheet containing calcium silicate as the sole reactant, the particular amounts of metal oxide and phosphoric acid in the solution would be determined with respect to the entire amount of calcium silicate in the reactant sheet. The exact amount of both the metal oxide and phosphoric acid in the solution can be used in accordance with both the characteristics needed for the product, and with the ratios and amounts recommended for reaction systems of this nature. For example, the amount of calcium silcate actually in the sheet would be arbitrarily set at 100 parts by weight. The amount of phosphorous pentoxide in the solution could then be placed at a level within a desired range which would be elected to give enough phosphorous for the reaction.

The reactant concentration ratios suitable for phosphate ceramic reactions can be applied to the embodiments of the instant invention. This allows considerable breadth in the reactant concentrations. Certain ratio limits, however, are recommended in the instant case.

Preferably, therefore, the metal of the metal oxide to phosphorous mole ratio in the reaction system (the phosphate reactive sheet and the aqueous solution combined) should be from 1:1 to about 1:4. Preferably, the calcium to phosphorous mole ratio is set to form a neutral ceramic binder, thus giving a hydrolytically stable product. If, however, factors such as intended use make hydrolytic stability of less importance, then less calcium could be used relative to the phosphate. The calcium:phosphorous ratio thus, broadly, could range from about .5:1 to about 4:1, or, at least from .75:1 to 2.5:1. If, however, hydrolytic stability is desired, the calcium:phosphorous ratio is preferably from about 1:1 to about 4:1, and, more preferably, from 1:1 to 2.5:1.

In some preferred embodiments, the amount of calcium silicate in the substrate is arbitrarily 100 parts by weight with the other reactants measured against the silicate as follows: from about 11 to about 65 parts by weight of the selected metal oxide; and an aqueous solution containing phosphoric acid, the phosphorous being present in an amount of from about 50 to about 200 parts by weight. The selected amount of phosphoric acid conveniently can be combined to provide both the amount of phosphorous required for the reaction, and the amount of solution required to wet the mixture.

For most embodiments, all the calcium silicate is present in the wet or dry laid substrate. In some preferred embodiments, however, some calcium silicate is included in the phosphoric acid solution which is applied to the wollastonite-containing reactive sheet. Including a portion of calcium silicate in the phosphorous acid solution causes a coating to form on the substrate's surface as the reaction continues inside it. This coating is predominately from the calcium silicate. Advantageously, this results in a surface which is both non-acidic, and smoother. The surface can also more easily be imprinted or embossed with a design. In this case, slurry of the solution can acceptably be from about 1 to about 35% by weight calcium silicate. When including calcium silicate with the phosphoric acid solution, preferably, the mixture is from about 5 to about 25% by weight calcium silicate. This will not diminish the amount of wollastonite in the substrate since the wollastonite in the solution will mainly coat the surface. The amount of metal oxide mixed with the solution to react with the phosphoric acid will not be altered due to the added wollastonite.

It can be noted that the term "solution" is therefore used broadly, herein to include aqueous reaction mixtures of phosphoric acid and desired amounts of the other dry reactants. Such mixtures will be like a slurry when the amount of dry reactant added is not completely dissolved. The slurry-like nature will not interfere with the production of the phosphate ceramic although it is easier to wet the substrate with less viscous solutions (and slurries). If it is found that a solution is too viscous, an effective amount of water can be added.

In wet laying, the ingredients are flocculated out of an aqueous suspension into a solid mass which is then dewatered with or without roll pressing to form the substrate material. Any sheet forming apparatus can be used. Those preferred for this step are common in the papermaking industry; the Fourdrinier wire is one of the more popular.

In using the wet laying procedure to prepare the instant phosphate reactive sheets, the metal oxide and/or the calcium silicate is combined in an aqueous suspension along with the selected fiber. When a filler is also used, it is included in the aqueous suspension before flocculation. Usually the suspension has enough water to maintain the solids level at from about .5 to about 2%. Agitation is used to saturate the solids ingredients and achieve a uniformly mixed suspension of the solids material. If a binder is to be used, it could be mixed in the suspension along with the other ingredients, although, preferably, it is mixed in after the addition of the flocculant and base usually before, or during agitation.

An appropriately selected flocculant and base is added to the suspension to flocculate the material into a solid mass. The base is used in the amount needed to place the pH of the aqueous solution in the range of from about 7 to about 8. A preferred base can be selected from the group consisting of: ammonium hydroxide, sodium carbonate, sodium hdyroxide, potassium hydroxide, and sodium bicarbonate.

Any flocculant can be used in an effective amount to achieve flocculation. Suitable flocculants can be provided by using a salt or of one or more of a cationic member selected from the group consisting of: aluminum, magnesium, and barium. An aluminum salt is preferred and aluminum sulfate (alum) is most preferred. Typically, the aqueous mixture is agitated until the flocculation is complete. The flocculated solids material is then formed ("wet-laid") into a sheet material as water is removed. Frequently, the sheet material is roll pressed in order to remove more water. The formed sheet is then dried. A very effective and convenient type of drying is the drum dryer.

Dry laying can also be used to prepare phosphate reactive sheets. In preparing the instant phosphate reactive sheets, using dry laying, a higher concentration of the fiberous matrix is used in order to give the prepared sheet (substrate) enough body strength and continuity to hold together. If desired, a binder can also be used. A dry laid phosphate reactive sheet typically will have a minimum of about 65% by weight fibrous matrix, or it can have a minimum of about 50% fiber with from 0.5 to 11% by weight binder. A binder is preferably used.

Dry laying procedures are well known and used in the art for making ceiling and wallboards, cardboards, and other paper products. Such technology can easily be adapted to carry mixtures of fiber and calcium silicate with or without metal oxide, binder, and possibly a filler material, if desired. Suitable procedures and apparatus which might be adapted to prepare the instant phosphate reactive sheet materials can be found described in U.S. Pat. Nos. 2,581,069; 4,146,564; and 4,435,353.

When part of the matrix includes binder, an effective amount of binder is used. Binders may especially be desired in substrates having low fiber content, the binder being needed to give extra hold to the substrate form. It has been found, however, that cellulose fibers and polyvinyl alcohol fibers will reduce or eliminate the need for a binder. The use of polyvinyl alcohol fibers in amount of from about 0.5 to about 5% by weight in a mixture with the other fibers is preferred therefore in lieu of a binder.

Binders usually make it more difficult for the solution to set the reactive substrate, especially binders that cannot be dissolved or penetrated by the solution. Such binders, therefore, are acceptably used in an amount of from about 0.5 to about 11% by weight, while solution penetratable binders are acceptably used in an amount of from about 0.5 to about 20% by weight. Preferred solution soluable or penetratable binders are starch, water-swelling chemically-delaminated mica, water-swelling chemically-delaminated vermiculite, and mixtures of water-swelling chemically-delaminated vermiculite and mica.

A variety of processing adaptations can be implemented. Such adaptations would include the application of pressure, molding, and embossing during the reaction and curing step. Similarly, various procedures can be used to apply the solution to the phosphate reactive sheet. Roll coating, spraying, painting, or immersing can be used to apply the phosphoric acid solution to the reactive sheet.

The phosphoric acid solution applied to the reactive sheet should be at least 25% by weight in phosphorous pentoxide; and preferably, is at least 35% by weight of the phosphorous pentoxide. Although it is possible to use concentrated solutions as high as 75% down to 25% in phosphorous pentoxide, at the lower concentrations, the desired metal oxide is easily added and the solution will more easily wet either the dry or wet laid substrate. A preferred concentration range for the phosphorous pentoxide in the solution is from about 35 to about 65% by weight phosphorous pentoxide.

The use of a sufficient amount of pressure can insure a complete wetting of the reactive sheet or can place the sheet into the shape or configuration desired for the product. The amount of pressure desired can vary widely from as low as about 90 psi to about 1,500 psi or even higher. The lower pressures (20–100) might be suitable for molding or shaping a substrate. It will be readily appreciated that if solutions highly concentrated in phosphorous pentoxide are used especially along with concentrations of metal oxide and/or a desired amount of calcium silicate, that the use of pressure will help to wet the dry or wet laid sheet. Pressures in the range of from about 100 to about 500 psi (pounds per square inch) are recommended if one desires to help wet the substrate. If, in addition to this, one desires a stronger ceramic product, then pressures in excess of 500 psi are recommended. A preferred pressure range is from about 500 to about 1,500 psi. For these embodiments, the fibrous portion of the matrix is preferably used in the larger amounts.

Pressure can also be used to make articles by pressing two or more substrates together. Preferred articles which can be made with the instant reactive substrates are boards, panels, bricks, blocks, or tiles.

If the phosphate-reactive sheet either has no metal oxide, or if more metal oxide is desired for the product, then it will be added to the solution which is applied to produce the phosphate ceramic. For sheets which have no metal oxide, the solution contains the total amount of metal oxide required for the ceramic.

Preferred embodiments of this nature, provide for the total amount of metal oxide to be selected within the range of from about 11 to about 65 parts by weight of metal oxide based upon 100 parts by weight of calcium silicate (the total amount of silicate in the sheet); preferably, from about 1 to about 75% of this metal oxide is placed in the sheet with the calcium silicate.

Embodiments with metal oxide in the solution, used for sheets either with or without metal oxide, tend to have a reaction system which "sets" (become hard) before the temperature reaches the vaporization point of water. These reaction systems are especially preferred where pressure is used for shaping, molding, or to produce a stronger ceramic sheet, since a rapidly setting reaction system will require pressure for a shorter period of time.

The time needed for the reaction to set can also be decreased by using the application of heat during the reaction. Thus, "curing" (setting) of the material can be accelerated. A temperature in the range of from about 60° to about 120° C. is recommended to accelerate this curing step. A subsequent drying step is sometimes preferred for rapidly cured materials.

A filler and/or fiber mixture can allow different characteristics to be obtained, if desired, although this will largely be determined by the end use. For example, in decorative uses with a discriminatory selection of filler and/or fiber material, variations in textural characteristics can also be achieved; the filler and/or fibrous material can even be selected and arranged so that attractive patterns or designs are provided. Frequently, a binder will be desired. Pigments can also be included. Decorative features would be particularly desired where the reactive sheet was to be used for visible surfaces such as in rooms as wall or ceiling boards. Similarly, in static dissipative electrical applications the filler and/or fiber material selected would have good conductivity so that electrical charge could be dissipated readily. In other applications, the fiber and filler could be selected which is heat resistant or has a low thermal conductivity.

The fiber used with the instant process and compositions can be natural, synthetic, or both. Natural fibers should be understood to be a fiber made out of any naturally available material, including metal, non-reactive mineral, and cellulosic materials. Fibers selected from cellulosic fibers and polyvinyl alcohol fibers are included in some of the most preferred embodiments of the instant invention. Other fibers used with the instant invention can also be made of material selected from the group consisting of: polyethylene, polyvinyl alcohol, polypropylene, carboxylated acrylonitrile butadiene, polyvinylidene chloride, polystyrene, polystyrene butadiene, polyvinyl chloride, polyamide, polybenzimidazole, polyacrylate, and polyaramid. Preferred fibers can be selected from the group consisting of polybenzimidazole, polyaramid, polyvinyl alcohol, cellulose, glass, ceramic wool, and carbon fiber.

The fiber selected for specific embodiments of the instant invention will depend upon the characteristics and properties desired for the final product. Tear strength can be given to a reactive sheet by using longer fibers (from $\frac{1}{4}"$ to 1"). If flame, heat, and smoke resistance is a factor, polybenzimidazole fibers would be preferred.

When the substrate is wet-laid, preferably, the fibers are used in an amount of from about 14 to about 70% by weight of the total amount of solids material used to prepare the reactive sheet. A preferred aspect ratio range for the fiber used is from about 10 to about 25,000.

Material can be selected from fillers and pigments to provide additional non-reactive material for characteristics desired in the substrate or the phosphate ceramic products. The filler material selected or desired in a particular instance will depend upon the characteristics desired in the final product. The filler material is also inert to the reaction and can be either natural or synthetic. Some suitable naturally found materials which could be adapted as filler material for the instant invention include: metals and minerals. Preferred fillers include: glass, talc, metallic dust, metal chips, glitter, perlite, silica, clay, mica, and vermiculite.

The instant invention can also be readily understood from the examples that follow. It should be understood, however, that these examples are offered to illustrate the instant invention and thus, they should not be taken to limit it unnecessarily. All parts and percentages are by weight unless otherwise indicated.

EXAMPLE 1

A slurry of the following composition is prepared in a Waring blender:
13.18 parts refined wood pulp
8.49 parts ceramic wool
71.2 parts wollastonite
7.12 parts magnesium oxide
3932 parts water After blending for 30 seconds (sec.), the slurry is poured into a container and diluted with water to 1.3% solids. While stirring slowly, 0.02 grams of Percol-224, an anionic retention aid, was added. The slurry was then pored into a Williams sheet mold and drained. The paper that formed on the screen, in the bottom of the mold, was removed, pressed at 4–5 lbs./sq. inch to remove excess water, and dried using a hot water heated, drum drier.

This sheet was then saturated by coating it in a slurry of the following: 14.0 parts of a finely divided wollastonite, 1.4 parts of magnesium oxide (dead burn), and 100 parts of an aluminum phosphate solution containing 100 parts of an 85% phosphoric acid and 20 parts aluminum hydroxide and 25 parts water. Five minutes was allowed for the slurry to saturate the paper and then the sheet cured at a temperature of 180° F. to form a rigid fibrous ceramic structure. No pressure was applied. This finished product has a density of 83.5 lb./Ft3. and a thickness of .075 inch. ASTM Method D-1037, used to test flexural strength, gave a value of 2653 psi.

EXAMPLE 2

This example is included to specifically show that the instant phosphate reactive sheet materials can be used to prepare rigid building panels which can be embossed so that it has a design or attractive appearance. A slurry of the following composition was prepared:
- 180 grams wood pulp
- 45 grams newsprint pulp
- 4.5 grams ¼" glass fibers
- 90 grams (Nyad 400) Wollastonite
- 18 grams MgO
- 112.5 grams perlite (filler)

Using procedure generally described in Example 1, a base sheet was wet-laid. The sheet was then dried, but not pressed. The dried sheet was then saturated with a solution containing the following:
- 141.4 grams 85% $H_3PO_4$
- 28.3 grams Alumina Trihydrate
- 103.3 grams $H_2O$ After saturation, the sample was pressed and cured to form a rigid, embossed sheet. The sheet could be used as a panel for either the ceiling or the wall.

EXAMPLE 3

A slurry of the following composition is prepared in a Waring blender:
- 13.18 parts refined wood pulp
- 8.49 parts ceramic wool
- 71.2 parts wollastonite
- 7.12 parts magnesium oxide
- 3932 parts water After blending for 30 seconds (sec.), the slurry is poured into a container and diluted with water to 1.3% solids. While stirring slowly, 0.02 grams of Percol (224), an anionic flocculant (also called a retention aid) was added. The slurry was then poured into a Williams sheet mold and drained. The paper that formed on the screen, in the bottom of the mold, was removed, pressed at 4–5 lbs./sq. inch to remove excess water, and dried using a hot water heated, drum drier.

This sheet was then saturated using a slurry of the following: 14.0 parts of a finely divided wollastonite, 1.4 parts of magnesium oxide (dead burn), and 100 parts of an aluminum phosphate solution containing 100 parts of 85% phosphoric acid and 20 parts aluminum hydroxide and 25 parts water. Five minutes was allowed for the slurry to saturate the paper and then the sheet was pressed in a flat press at a pressure of 1,000 psi (pounds per square inch); and heated to 180° F. A piece of Teflon cloth was placed between the press plates and the saturated paper to prevent sticking. The sample was allowed to cure for 3 minutes in the press, and was removed and placed in an oven at 200° F. for 60 minutes. The resulting sheet had a smoother coating from the addition of the calcium silicate to the solution and that the following properties.
- Sheet Density = 121.5 lbs/ft3
- Flexural Strength = 7974 psi (pounds per square inch)

EXAMPLE 4

A series of different pressures were applied to saturated papers having the identical composition and made using the identical procedure and slurry as described in Example 1. The same equipment and saturation procedure was used. The 180° curing temperature was used but pressure was applied for 3 minutes until the setting reaction caused the sample to become rigid. The samples were then baked in an oven at 200° F. to evaporate water from the rigid sample. The following results are obtained:

TABLE 1

| Pressure | Sheet Thickness of Finished Sheet | Sheet Density of Finished Sheet | Flexural Strength |
|---|---|---|---|
| 139 psig | 0.58 in | 106.9 lb/ft 3 | 6184 psi |
| 417 psig | .052 in | 111.8 lb/ft 3 | 6668 psi |
| 694 psig | .047 in | 115.7 lb/ft 3 | 6894 psi |

Pounds Per Square Inch (psi)
Pounds Per Cubic Foot (lb/ft 3)

From the data of Table 1, it can be noted that the psi flexural strength of the finished product increased over 130% with the application of only 139 psi of pressure to the saturated paper being cured; the increase in density was 30%.

EXAMPLE 5

This Example demonstrates that several substrates can be pressed together to form high strength articles.

Using the procedure described in Example 1, four 12"×12"sheets of the following composition were made in a wet-lay handsheet mold:
- 8.9 parts by weight cellulose fiber
- 8.9 parts glass fiber
- 74.7 parts calcium silicate
- 7.47 parts magnesium oxide The sheets were then saturated using a slurry of the following: 14.0 parts of a finely divided wollasatonite, 1.4 parts of magnesium oxide (dead burn), and 100 parts of an aluminum phosphate solution containing 100 parts of 85% phosphoric acid and 20 parts aluminum hydroxide and 25 parts water.

The sheets were then pressed at 1000 psig and 180° F. for two minutes. The resulting multi-layered composite was then removed and dried at 200° F. for another 30 minutes. Sample thickness was measured at 95 mils. The sample was tested and the following data collected:

| Bending Strength | Strength Retained After Soaking in $H_2O$ for 44 Hrs. |
|---|---|
| Flexural Strength ASTM D-1037 7,000 psi | 75% |

EXAMPLE 6

A slurry of the following composition was prepared in a Waring blender:
- 13.17 parts refined wood pulp
- 8.48 parts glass wool
- 71.2 parts wollastonite
- 7.13 parts magnesium oxide
- 3932 parts water After blending for 30 seconds (sec.), the slurry was poured into a container and diluted with water to 1.3% solids. Thereafter, while stirring slowly, 0.01 parts by weight of an anionic flocculant (Retention Aid - Percol (224) was added. The slurry was then poured into a Williams sheet mold and drained. The paper that formed on the screen in the bottom of the mold was removed, pressed at 4–5 lbs./sq. inch to remove excess water, and dried using a hot water heated, drum drier.

This sheet was then saturated with the following slurry: 14.0 parts of a finely divided wollastonite, 1.4 parts of magnesium oxide (dead burn), and 100 parts of an aluminum phosphate solution containing 100 parts of 85% phosphoric and 20 parts aluminum hydroxide and 25 parts water. Five minutes was allowed for the slurry to saturate the paper and then the sheet was pressed in a flat press at a pressure of 1,000 psi, and at a temperature of 180° F. A piece of Teflon cloth was placed between the press plates and the saturated paper to prevent sticking. The sample was allowed to cure for 3 minutes in the press until it was rigid. Then it was removed and placed in an oven at 200° F. for 60 minutes. The resulting sheet was tested and the following data was collected.

(A) Sheet Density = ASTM D-1505-68 20.39 Kg/m$^3$ (Kilogram/meter$^3$)
(B) Flexural Strength ASTM: D-1037 6973 psi
(C) Flexural Modulus ASTM: D-1037 1949 kilograms per square inch (ksi)
(D) Tensile Strength (MEP 36R.1)
   Yield: 1634 psi dry–1049 psi wet
   Ultimate: 2050 psi dry–1539 psi wet
(E) Tensile Modulus MEP 36R.1 1569 ksi dry–1544 ksi wet
(F) Compressive Strength (ASTM D-695) 18,333 psi
(G) Impact Strength (ASTM D256-81)
   (1) Unnotched: 38.7 inch-lb/sq. in.
   (2) Notched: 22.4 inch-lb/sq. in.
(H) Tensile Strength (Perpendicular) (ASTM C-209) Load - Pull 120 psi

EXAMPLE 7

Using the procedures and slurry as described in Example 6, separate ceramic-fiber sheets were prepared. The ingredients and amounts are listed below (not including the 0.01 parts of the flocculant - Percol 224) along with test results for the sheet produced.

Sample A Composition (6.58 parts refined wood pulp
8.49 parts glass wool
6.58 parts fibrillated polypropylene fiber
71.2 parts wollastonite
7.13 parts magnesium oxide

Test Results (A) Sheet Density = ASTM D-1505-68 113.4 Kg/m$^3$ (Kilogram/meter$^3$)
(B) Flexural Strength ASTM: D-1037 5860 psi
(C) Flexural Modulus ASTM: D-1037 1732 kilograms per square inch (ksi)
(D) Tensile Strength (MEP 36R.1)
   Yield: 1547 psi dry—957 psi wet
   Ultimate: 2330 psi dry—1299 psi wet
(E) Tensile Modulus MEP 36R.1 1580 ksi dry—1402 ksi wet
(F) Compressive Strength (ASTM D-695) 12750 psi
(G) Impact Strength (ASTM D256-81)
   (1) Unnotched: 25.76 inch-lb/sq. in.
   (2) notched: 17.26 inch-lb/sq. in.
(H) Tensile 9Strength (Perpendicular) (ASTM C-209) Load - Pull 140 psi

Sample B Composition 13.76 parts refined wood pulp
4.43 parts carbon wool
74.36 parts wollastonite
7.44 parts magnesium oxide

Test Results (A) Sheet Density = ASTM D-1505-68 114.79 Kg/m$^3$ (Kilogram/meter$^3$)
(B) Flexural Strength ASTM: D-1037 9370 psi
(C) Flexural Modulus ASTM: D-1037 2320 ksi
(D) Tensile Strength (MEP 36R.1)
   Yield: 1758 psi dry—866 psi
   Ultimate: 3420 psi dry—1817 psi wet
(E) Tensile Modulus MEP 36R.1 1726 ksi dry—1307 ksi wet
(F) Compressive Strength (ASTM D-695) 20917 psi
(G) Impact Strength (ASTM D256-81)
   (1) Unnotched: 52.78 inch-lb/sq. in.
   (2) Notched: 28.52 inch-lb/sq. in.

Sample C Composition 13.17 parts refined wood pulp
8.48 parts ceramic wool fiber
71.2 parts wollastonite
7.13 parts magnesium oxide

Test Results (A) Sheet Density=ASTM D-1505-68 121.42 Kg/m$^3$ (Kilogram/meter$^3$)
(B) Flexural Strength ASTM: D-1037 8540 psi
(C) Flexural Modulus ASTM: D-1037 2290 ksi
(D) Tensile Strength (MEP 36R.1)
   Yield: 2400 psi dry—1626 psi wet
   Ultimate: 2820 psi dry—2130 psi wet
(E) Tensile Modulus MEP 36R.1 1976 ksi dry—839 ksi wet
(F) Compressive Strength (ASTM D-695) 28700 psi
(G) Impact Strength (ASTM D256-81)
   (1) Unnotched: 34.88 inch-lb/sq. in.
   (2) Notched: 17.89 inch-lb/sq. in.

Sample D Composition 6.59 parts refined wood pulp
8.48 parts ceramic wool fiber
6.58 parts polyviny alcohol fibers (Kuralon 103)
71.2 parts wollastonite
7.13 parts magnesium oxide The polyvinyl alcohol fibers (Kuralon 103 by KURARAY) are 70% solid and are non-soluble.

Test Results (A) Sheet Density = ASTM D-1505-68 116.69 Kg/m$^3$ (Kilogram/meter$^3$)
(B) Flexural Strength ASTM: D-1037 5860 psi
(C) Flexural Modulus ASTM: D-1037 1019 ksi
(D) Tensile Strength (MEP 36R.1)
   Ultimate: 2720 psi dry—1479 psi wet
(E) Compressive Strength (ASTM D-695) 35167 psi
(F) Impact Strength (ASTM D256-81)
   (1) Unnotched: 54.53 inch-lb/sq. in.
   (2) Notched: 33.19 inch-lb/sq. in.
(G) Tensile Strength (Perpendicular) (ASTM C-209) Load - Pull 133 psi

Sample E Composition 6.72 parts polyvinyl alchol (KURALON 103)
0.5 parts polyvinyl alcohol (KURALON 105)
7.22 parts glass wool
7.22 parts fibrillated polypropylene
71.2 parts wollastonite
7.13 parts magnesium oxide Kuralon 105 by Kuralay is a 96% solid fiber that is soluble in water that is over 30° C. This fiber has binding ability. This experiment was done in water at room temperature (about 25° C.).

A) Sheet Density =ASTM D-1505-68 108.55 Kg/m³ (Kilogram/meter³)
(B) Flexural Strength ASTM: D-1037 7760 psi
(C) Flexural Modulus ASTM: D-1037 1457 ksi
(D) Tensile Strength (MEP 36R.1)
  Ultimate: 1920 psi dry - 1386 psi wet
(E) Compressive Strength (ASTM D-695) 21040 psi
(F) Impact Strength (ASTM D256-81)
  (1) Unnotched: 54.74 inch-lb/sq. in.
  (2) Notched: 24.48 inch-lb/sq. in.
(G) Tensile Strength (Perpendicular) (ASTM C-209)
  Load - Pull 128.33 psi

EXAMPLE 8

This Example is offered to show the slight variations in some physical characteristics which can be obtained using different types of paper-making apparatus. Comparison can be made to Example 6 which shows the same composition, but the use of the Williams sheet mold.

The wet-laid phosphate reactive substrate composition having the identical ingredients in the identical proportions as appears in Example 6 were prepared on a Pilot plant scale. The apparatus used included a pulper batch container, a precipitation tank, and a Fourdrinier wire for wet-laying. A drum dryer was also used at a temperature of 220° F.

An aqueous slurry of the cellulose fibers was prepared in the first pulper batch, an aqueous slurry of the glass wool fibers was prepared in the second pulper batch, and an aqueous slurry of the wollastonite and magnesium oxide was prepared in the third pulper batch. The aqueous pulper batch slurries were then pumped to the precipitation tank and water was added to bring the slurry to 1.33% solids. Nine hundred gallons of water was present in the tank. The flocculant (Percol 224) was added at a speed of 240cc/minute while agitation continued. The sheet was wet-laid using a Fourdrinier wire at a line speed of three feet per minute. The sheet was then dried at 220° F.

A slurry having the same makeup as is described in Example 4 was used to saturate a sample of this Fourdrinier wire prepared material. After saturation, the procedure described in Example 6 was also used to prepare the phosphate ceramic fiber product. The test results and the composition ingredients are given below.

Composition 13.17 parts refined wood pulp
8.48 parts glass wool
71.2 parts wollastonite
7.13 parts magnesium oxide Test Results (A) Sheet Density =ASTM D-1505-68 121.01 Kg/m³ (Kilogram/meter³)
(B) Flexural Strength ASTM: D-1037 6410 psi
(C) Flexural Modulus ASTM: D-1037 1881 ksi
(D) Tensile Strength (MEP 36R.1)
  Yield: 2163 psi dry—1050 psi wet
  Ultimate: 2957 psi dry—1520 psi wet
(D) Tensile Modulus (MEP 36R.1)
  Yield: 2163 psi dry—1050 psi wet
  Ultimate: 2957 psi dry—1520 psi wet
(E) Tensile Modulus MEP 36R.1 1552 psi dry—1332 psi wet
(F) Compressive Strength (ASTM D-695) 14375 psi
(G) Impact Strength (ASTM D256-81)
  (1) Unnotched: Machine Direction 36 inch-lb/sq. in.
    Against Machine Direction 27.5 inch-lb/sq. in.
  (2) Notched: Machine Direction 23.5 inch-lb/sq. in.
    Against Machine Direction 18.96 inch-lb/sq. in.
(H) Tensile Strength (Perpendicular) (ASTM C-209)
  Load - Pull 80 psi.

What is claimed is:

1. A phosphate reactive composition consisting essentially of a wet-laid substrate which is a mixture that includes calcium silicate as a phosphate reactant, wherein the calcium silicate is in the substrate in an amount effective to produce a phosphate ceramic material, a non-reactive matrix in an amount effective to hold the wet-laid substrate together, said matrix being either (i) fiber or (ii) fiber and a binder, and a metal oxide as a phosphate reactant, said metal oxide being selected from the group consisting of zinc oxide, aluminum oxide, calcium oxide and magnesium oxide.

2. A composition as described in claim 1 wherein the calcium silicate is present in an amount of from about 20 to about 86% by weight.

3. A composition as described in claim 1 wherein the calcium silicate is present in a minimum amount of about 15% by weight, and wherein in (i) the fiber is in an amount of at least 10% by weight, and where, in (ii) the fiber is present in a minimum of about 5% by weight, and the binder is present in an amount of at least .5% by weight, and where the metal oxide is present at an amount which, taken relative to the amount of calcium silicate gives a reactant concentration ratio suitable for producing the phosphate ceramic material.

4. A composition as described in claim 1 also having a non-reactive ingredient selected from the group consisting of a filler and a pigment to provide a desired characteristic.

5. A composition as described in claim 1 wherein the metal oxide is present at an amount in the range of from about 11 to about 65 parts by weight of metal oxide based on the amount of calcium silicate in the substrate.

6. A composition as described in claim 1 wherein the matrix includes fibers selected from the group consisting of cellulosic fibers and polyvinyl alcohol fibers.

7. A composition as described in claim 2 wherein the matrix includes fiber having a length in the range of from ¼ inch to 1 inch.

8. A composition as described in claim 5 wherein the matrix is (i).

9. A composition as described in claim 5 wherein the matrix is (i) and includes fiber having a length in the range of from ¼ inch to 1 inch.

10. A composition as described in claim 5 also having a non-reactive ingredient selected from the group consisting of a pigment and a filler to provide a desired characteristic.

11. A composition as described in claim 1 wherein the fiber has an aspect ratio in the range of from about 10 to about 25,000.

12. A composition as described in claim 8 wherein the matrix includes fibers selected from group consisting of polyvinyl alcohol fibers and cellulosic fibers.

13. A composition as described in claim 1 wherein the binder is a type which would be dissolved by or would be penetrated by a phosphoric acid solution.

14. A phosphate-reactive composition consisting essentially of a dry-laid substrate which is a mixture having calcium silicate as a phosphate reactant, the said calcium silicate being present in an amount effective to produce a phosphate ceramic material, a non-reactive matrix in an amount effective to hold the dry-laid substrate together, said matrix being (i) fiber, or (ii) fiber and a binder, and of metal oxide selected from the group consisting of: zinc oxide, aluminum oxide, calcium oxide, and magnesium oxide as a phosphate reactant, further providing that the substrate would react with a solution having phosphoric acid to become a rigid phosphate ceramic material.

15. The composition of claim 14 wherein the matrix is further described as either, in (i) a minimum of about 65% by weight of the fiber and a minimum of .5% by weight of the binder.

16. A composition as described in claim 14 wherein the metal oxide is present in an amount of from about 11 to about 65 parts by weight based on the amount of calcium silicate.

17. A composition as described in claim 14 wherein the fiber is selected from the group consisting of: polybenzimidazole, polyaramid, polyvinyl alcohol, cellulose, glass, ceramic wool, and carbon.

18. A composition suitable for preparing a phosphate ceramic product, said composition comprising:
(A) a wet-laid phosphate reactive substrate which includes (1) calcium silicate as a phosphate reactant, said calcium silicate being present in an amount effective to produce a ceramic material, this amount being a minimum of about 15% by weight (2) a non-reactive matrix in an amount effective to hold the substrate together, said matrix being either (i) fiber or (ii) fiber and a binder and (3) a metal oxide selected from the group consisting of: zinc oxide, aluminum oxide, calcium oxide and magnesium oxide, further providing that the metal oxide is present in the substrate as a phosphate reactant, and
(B) a solution of either (1) phosphoric acid as a reactant or (2) a reaction mixture of phosphoric acid and a metal oxide selected from the group consisting of: zinc oxide, aluminum oxide, calcium oxide and magnesium oxide, further providing that the calcium silicate of (A), the metal oxide from (A) and (B), and the phosphoric acid together are present in a concentration ratio suitable to produce the phosphate ceramic product.

19. The composition of claim 18 wherein the metal oxide from both (A) and (B) taken relative to the phosphoric acid has a metal:phosphorous mole ratio in the range of from 1:1 to about 1:4, and wherein the calcium silicate in the substrate taken relative to the phosphoric acid in the solution has a calcium:phosphorous mole ratio in the range of from about .5:1 to about 4:1.

20. The composition of claim 18 wherein an additional amount of calcium silicate is included in solution (1) of (B) at an amount in the range of from about 1 to about 35% by weight.

21. The composition of claim 18 wherein the wetlaid phosphate reactive substrate also includes as a nonreactant, a material selected from the group consisting of a pigment and a filler to provide a desired characteristic.

22. The composition of claim 18 wherein the matrix includes fiber selected from the group consisting of: polybenzimidazole, polyaramid, polyvinyl alcohol, cellulose, glass, ceramic wool and carbon.

23. The composition of claim 18 wherein the solution of (B) is (1).

24. The composition of claim 18 wherein the fiber of (i) is a minimum of 10% by weight and wherein, under (ii) the fiber is present in a minimum of about 5% by weight and the binder is present in an amount of at least .5% by weight, further providing that the calcium silicate is in the wetlaid substrate in an amount in the range of from about 20 to about 86% by weight and the metal oxide is present in the substrate at an amount in the range of from about 11 to about 65 parts by weight based on the amount of calcium silicate in the substrate.

25. A composition as described in claim 18 wherein the matrix is (i).

26. A composition as described in claim 23 wherein the matrix is (i).

27. A ceramic composition comprising a phosphate ceramic material produced by contacting a wet-laid phosphate reactive substrate with a solution of either (1) phosphoric acid or (2) phosphoric acid and a metal oxide selected from the group consisting of zinc oxide, aluminum oxide, calcium oxide and magnesium oxide, wherein further the wet-laid phosphate reactive substrate was a mixture including calcium silicate as a phosphate reactant, the said calcium silicate being present in an amount effective to produce the phosphate ceramic material, the said amount being a minimum of about 15% by weight of the substrate, a metal oxide as a phosphate reactant, the said metal oxide being selected from the group consisting of zinc oxide, aluminum oxide, calcium oxide and magnesium oxide, and a non-reactive matrix in an amount effective to hold the substrate together, said matrix being either (i) fiber or (ii) fiber and a binder, further providing that the calcium silicate in the substrate, the metal oxide from both the substrate and the solution, and the phosphoric acid were present in a concentration ratio suitable to produce the phosphate ceramic material.

28. A composition as described in claim 27 wherein the metal oxide from both the substrate and the solution is a total amount in the range of from about 11 to about 65 parts by weight based on the amount of calcium silicate in the substrate.

29. The composition of claim 27 wherein the metal oxide from both the substrate and the solution, and the phosphoric acid together have a metal:phosphorous mole ratio in the range of from 1:1 to about 1:4, and wherein the calcium silicate in the substrate taken relative to the phosphoric acid in the solution has a calcium:phosphorous mole ratio in the range of from about .5:1 to about 4:1.

30. The composition of claim 27 wherein the matrix includes fiber selected from the group consisting of polybenzimidazole, polyaramid, polyvinyl alcohol, cellulose, glass, ceramic wool and carbon fiber.

31. The composition of claim 27 wherein the wetlaid phosphate reactive substrate also includes a material selected from the group consisting of a pigment and a filler, as a non-reactant to provide a desired characteristic.

32. The composition of claim 27 wherein an additional amount of calcium silicate was included in the solution, to provide a coating on the ceramic composition, further providing that this amount of calcium silicate was in the range of from about 1 to about 35% by weight of the solution.

33. The composition of claim 27 wherein the fiber of (i) is a minimum of 10% by weight, and wherein under (ii) the fiber is present in a minimum of about 5% by weight and the binder is present in an amount of at least .5% by weight, further providing that the calcium silicate is present in an amount of from about 20 to about 86% by weight.

34. A ceramic composition comprising a phosphate ceramic material produced by contacting a dry-laid phosphate reactive substrate with a solution of either (1) phosphoric acid or (2) phosphoric acid and a metal oxide selected from the group consisting of zinc oxide, aluminum oxide, calcium oxide and magnesium oxide, wherein further the dry-laid phosphate reactive substrate was a mixture including calcium silicate as a phosphate reactant, the said calcium silicate being present in an amount effective to produce the phosphate ceramic material, the said amount being a minimum of about 15% by weight of the substrate, a metal oxide as a phosphate reactant, the said metal oxide being selected from the group consisting of zinc oxide, aluminum oxide, calcium oxide and magnesium oxide, and a non-reactive matrix in an amount effective to hold the substrate together, said matrix being either (i) fiber or (ii) fiber and a binder, further providing that the calcium silicate in the substrate, the metal oxide from both the substrate and the solution, and the phosphoric acid were present in a concentration ratio suitable to produce the phosphate ceramic material.

35. The composition of claim 34 wherein the metal oxide from both the substrate and the solution, and the phosphoric acid together gave a metal: phosphorous mole ratio in the range of from 1:1 to about 1:4, and wherein the calcium silicate in the substrate taken relative to the phosphoric acid in the solution has a calcium:phosphorous mole ratio in the range of from about .5:1 to about 4:1.

36. The composition of claim 34 wherein the rigid, phosphate ceramic material is further characterized as an article which can be described as a tile, a board, a panel, a block, or a brick.

37. The composition of claim 34 wherein an additional amount of calcium silicate was included in the solution to provide the phosphate ceramic material with a coating.

38. The composition of claim 34 wherein the matrix includes fiber selected from the group consisting of: polybenzimidazole, polyaramid, polyvinyl alcohol, cellulose, glass, ceramic wool and carbon.

39. A phosphate-reactive composition for preparing a phosphate ceramic material, the said composition consisting essentially of a wet-laid substrate which includes calcium silicate as a phosphate reactant in an amount effective to produce a phosphate ceramic material, the said amount being a minimum of about 15% by weight; a non-reactive matrix in an amount effective to hold the wet-laid substrate together, said matrix being fiber in a minimum amount of 10% by weight further providing that the fiber is either (i) selected from the group consisting of: polyethylene, polyvinyl alcohol, polypropylene, carboxylated acrylonitrile butadiene, polyvinylidene chloride, polystyrene, polystyrene butadiene, polyvinyl chloride, polyamide, polybenzimidazole, polyacrylate and polyaramide, or (ii) is selected from the group consisting of polybenzimidazole, polyaramid, polyvinyl alcohol, cellulose, glass, ceramic wool and carbon fiber, and a metal oxide as a phosphate reactant, the metal oxide being selected from the group consisting of zinc oxide, aluminum oxide, calcium oxide and magnesium oxide further providing that the metal oxide is present in an amount which is in the range of from about 11 to about 65 parts by weight based on the amount of calcium silicate in the substrate.

40. A phosphate reactive composition as described in claim 39 wherein the fiber is present in an amount of from about 14 to about 70% by weight.

41. A phosphate reactive composition as described in claim 39 wherein the matrix includes fiber having a length in the range of from ¼ inch to 1 inch.

42. A phosphate reactive composition as described in claim 39 wherein the calcium silicate is in the wet-laid substrate in an amount of from about 20 to about 86% by weight.

* * * * *

UNITED STATES PATENT AND TRADEMARK OFFICE
CERTIFICATE OF CORRECTION

PATENT NO. : 4,872,912
DATED : October 10, 1989
INVENTOR(S) : Jeffery L. Barrall et al It is certified that error appears in the above-identified patent and that said Letters Patent is hereby corrected as shown below:

In the Specification, in column 6, line 55, "90 psi" should read --20 psi--; in column 8, the following two paragraphs should appear before the paragraph starting at line 27:

In column 11, line 12, "20.39" should read --120.39--;

In column 11, line 61, "9" should be deleted;

In column 13, line 68 should be deleted;
In column 14, lines 1 and 2 should be deleted.

In the claims, claim 15 at column 15, after the word "fiber" the following words should be inserted --, or, in (ii) a minimum of about 50% by weight of the fiber --.

Signed and Sealed this

Eleventh Day of September, 1990

Attest:

HARRY F. MANBECK, JR.

*Attesting Officer*    *Commissioner of Patents and Trademarks*